United States Patent [19]
Haefele et al.

[11] Patent Number: 5,998,640
[45] Date of Patent: Dec. 7, 1999

[54] METHOD FOR RECOVERING OIL FROM AN OIL-BEARING SOLID MATERIAL

[76] Inventors: Gary R. Haefele, 6337 S. Jackson St., Littleton, Colo. 80121; Peter A. Allen, 8655 Franz Valley School Rd., Calistoga, Calif. 94545; Gary L. Dunkel, 3794 Jefferson Ave., Redwood City, Calif. 94062; Paul C. Wegner, 1340 Eaton Ave., San Carlos, Calif. 94070

[21] Appl. No.: 08/655,723

[22] Filed: May 30, 1996

Related U.S. Application Data

[60] Provisional application No. 60/011,571, Feb. 13, 1996.

[51] Int. Cl.$^6$ ........................... C07C 1/00
[52] U.S. Cl. ................ 554/12; 554/8; 554/15; 554/16; 554/20; 208/13; 208/30; 208/31; 208/45; 196/14.52; 426/312
[58] Field of Search ............... 554/8, 9, 12, 16, 554/20; 208/13, 30, 31, 45; 196/14.52; 426/313

[56] References Cited

U.S. PATENT DOCUMENTS

| | | | |
|---|---|---|---|
| 4,331,695 | 5/1982 | Zosel | 426/430 |
| 4,389,300 | 6/1983 | Mitchell | 208/11 |
| 4,401,551 | 8/1983 | Mitchell | 208/11 |
| 4,481,099 | 11/1984 | Mitchell | 208/11 |
| 4,676,889 | 6/1987 | Hsieh et al. | 208/390 |
| 5,041,245 | 8/1991 | Benado | 260/412.1 |
| 5,278,325 | 1/1994 | Strop et al. | 554/12 |
| 5,281,732 | 1/1994 | Franke | 544/16 |
| 5,408,924 | 4/1995 | Arendt et al. | 99/516 |
| 5,445,841 | 8/1995 | Arendt et al. | 426/312 |
| 5,516,923 | 5/1996 | Hebert et al. | 554/12 |
| 5,525,746 | 6/1996 | Franke | 554/12 |

Primary Examiner—Deborah D Carr

[57] ABSTRACT

A method and apparatus for continuously removing oil from oil-bearing solids such as tar sands, vegetables or other solid materials using a solvent is provided. By providing a pressure differential between the exterior and interior of an oil extraction chamber, substantially oil free solids may be removed from the oil extraction chamber through a solids extraction channel without removing any substantial volume of solvent through the solids extraction channel.

39 Claims, 5 Drawing Sheets

Fig. 5 ns in the lower portion
METHOD FOR RECOVERING OIL FROM AN OIL-BEARING SOLID MATERIAL The present continuation-in-part application claims priority from copending U.S. Provisional Patent Application Serial No. 60/011,571, entitled "Method And Apparatus For Recovering Oil From An Oil-Bearing Solid Material," filed Feb. 13, 1996, incorporated herein by reference in its entirety.

FIELD OF THE INVENTION

The present invention relates to a method and apparatus for extracting oils from oil-bearing materials such as tar sands, contaminated dirt, vegetable products such as soy beans, peanuts or corn, and botanical plants. The invention utilizes an organic solvent in an extraction chamber to remove the various oils from the solid materials in a partitioned, graduated manner while the substantially oil free solid materials are continuously removed from the extraction chamber without removing any substantial volume of the organic solvent.

BACKGROUND OF THE INVENTION

Numerous oil-bearing solid materials exist in nature. These include tar sands and vegetable products such as soy beans and peanuts. Other non-natural oil containing solids additionally exist, such as contaminated dirt resulting from oil spills or other environmental accidents. When these oils are successfully removed from these solid or semi-solid materials, a raw oil product is recovered which can be utilized for numerous purposes including heating, cooking and in the production of synthetic materials such as plastic or rubber.

The challenge of removing oils from either natural or unnatural sources is significant based on the economic and environmental costs associated with the accumulation and processing of these materials. To compete in a global market, the processing of these materials must be performed at a cost low enough to compete with other energy sources such as traditional oil production or coal mining. For example, in the processing of tar sands which contain oil-bearing bitumen, the oil-bearing sands must first be mined, the tar sand processed and the sand cleaned sufficiently to alleviate environmental concerns upon disposal or proper placement back into the environment.

Numerous processes have been utilized to recover oil from these various natural and non-natural occurring oil-bearing materials. One particular cold water method for separating oil from sand is shown in U.S. Pat. No. 1,567,983 where oil laden sand is passed over a plurality of washing drums which loosen the oil from the sand material. The oil, having a lower specific gravity then water, rises to the water surface for collection while the sand settles to the bottom for collection. This method is inefficient based on the amount of oil remaining in contact with the sand material and the amount of water which must be used.

In another method which utilizes hot water, the oil-bearing materials are subject to a jet of high pressure steam and introduced into a mixing vessel with hot water at a temperature near the boiling point. Low pressure steam is jetted into the mixture in the mixing vessel, which produces a froth of oil, water, and tar. As the froth accumulates above the level of the water in the tank the froth can be collected and recovered. These hot water batch processes are generally ineffective due to the high cost of heating the water and additionally requires a significant capital investment in equipment.

Other methods for removing oil from oil-bearing materials use organic solvents for extraction. These solvents include gasoline, naphtha, or other materials derived from petroleum based products. One particular process which utilizes organic solvents for extraction is disclosed in U.S. Pat. No. 4,389,300 to Mitchell. Mitchell discloses a vertical extraction zone where oil laden materials are introduced into the top of the extraction zone while liquid solvent is injected into an intermediate level of the vertical bed of materials while maintaining a substantially gaseous phase in contact with a lower portion of the bed. The liquid phase is prevented from flowing downwardly by attempting to maintain a gaseous phase at a sufficient pressure in the lower portion of the extraction zone The solids are removed from the lower portion of the bed with a screw-type auger assembly.

In U.S. Pat. No. 4,401,551, also issued to Mitchell, a process is described which again utilized a two-phase interface of gaseous and liquid solvent in a vertical bed of oil-bearing materials where the treated sand is removed with an auger assembly. The invention also utilizes recovered solvent at a temperature and pressure sufficient to maintain the solvent in a liquid phase to contact the oil-bearing bituminous sand to improve recovery. However, in both of the Mitchell patents the screw-type auger assembly allows a significant loss of solvent and the process is difficult to operate as a result of the gas in the lower portion of the chamber migrating upwards while the liquid solvent falls to the bottom of the extraction chamber.

In U.S. Pat. No. 5,281,732 issued to Frank, a batch method for extracting oils from vegetables is disclosed where an extraction chamber is filled with an oil-bearing material, the air purged from the extraction zone and a normally gaseous solvent introduced into the extraction chamber in a liquid phase. The liquid solvent is then pumped through the oil-bearing materials which extracts the oil from the oil bearing solids. The recovered oil and solvent are then transported to a separator in a liquid phase for separation and eventual recovery of the oil and solvent. Due to the batch nature of this operation, this type of process is inefficient for processing substantial volumes of oil-bearing solid materials and does not efficiently remove all of the solvent from the solid materials during processing.

Thus there is a substantial need for a method and apparatus which is efficient, cost effective, environmentally safe and can be performed in a continuous mode to process tremendous volumes of oil laden materials such as tar sands or soil from environmental clean-up sites. Furthermore, a need exists for an apparatus and method which is relatively mobile and which can be transported to a processing site at a potentially remote location.

SUMMARY OF THE INVENTION

The present invention provides a method and apparatus for extracting oil from oil-bearing materials such as tar sands, contaminated dirt or vegetables in a continuous, cost effective manner which is environmentally safe. Based on the efficiency of the process, the apparatus is relatively portable for transportation to small scale operations and may utilize a closed loop system which recirculates the organic solvents used for extraction. Thus, as oil-laden materials are processed, the only significant byproducts include the recovered oil and a substantially oil free solid product, i.e., sand, which may be reintroduced into the environment.

According to one aspect of the present invention, a method is described which includes the steps of introducing an oil-bearing solid material into an upper end of an oil extraction chamber which contains a solvent capable of removing the oil from the oil-bearing material. The oil-bearing solids then flow in a non-turbulent manner through the solvent, wherein a partitioned, graduated zone in the oil extraction chamber is created whereby the most soluble oils can be removed near the top of the extraction chamber while the least soluble oils can be removed near the bottom of the oil extraction chamber as clean solvent is introduced near the lower end of the oil extraction chamber. The extracted oils and solvents are removed from the upper end of the oil extraction chamber while the substantially oil-free solid materials are removed from the lower portion of the oil extraction chamber.

In another aspect of the present invention the substantially oil free solid materials are removed through a solids extraction channel located near the lower end of the oil extraction chamber. The solids extraction channel allows the solid materials to be controllably removed from the oil extraction chamber without removing any substantial volume of liquid solvent through the same solids extraction chamber. That is, no significant liquid component is removed, with the exception of a residual volume of solvent which is in contact with the solid material due to the wetting of the solid material in the oil extraction chamber. Preferably, no more than 10% by weight (of the dried sand material) of residual liquid solvent is removed from the solids extraction channel with the solids. More preferably, no more than 0.5–1% by weight of residual solvent is removed with the solids. This aspect of the invention is possible because a positive pressure differential is maintained between the exterior of the oil extraction chamber in a defined annular area and the interior of the oil extraction channel. This positive pressure differential maintains a substantially constant liquid solvent level in the solids extraction chamber and simultaneously forces the liquid solvent into the oil extraction chamber. At the same time, the forces of gravity and a motorized auger removes the solids from the oil extraction chamber through the solids extraction channel at a controlled rate.

In another aspect of the present invention the substantially oil free solids which are removed from the oil extraction chamber are collected in a drying chamber. These solid materials, which may contain a residual volume of liquid solvent and oil, are then heated to vaporize any remaining residual solvent or oil which is entrained in the solid materials. After vaporization, the residual solvent and/or oil is condensed on an exterior wall of the oil extraction chamber, which is at a reduced temperature due to the introduction of cool solvent. Due to the pressure on the outside of the oil extraction chamber, which is greater than the pressure on the interior of the oil extraction chamber, the condensed solvent flows back into the lower end of the oil extraction chamber through the solids extraction channel.

In yet another aspect of the present invention sonic and/or acoustic energy may be applied to the oil-bearing solid materials prior to, during, or after introduction into the oil extraction chamber. This energy source helps separate the oil from the oil-bearing solid materials.

In another aspect of the present invention, the extracted oil and liquid solvent is removed from the oil extraction chamber and transported to a separator where the solvent and recovered oil is separated. The oil may then be collected or stored for future sale while the solvent is recirculated in a continuous cycle back to the oil extraction chamber.

In yet a further aspect of the invention the oil-bearing solid materials may be presoaked with a solvent or oil prior to introduction into the oil extraction chamber to enhance the separation of the oil from the solid material. Additionally, an inlet chamber which is attached to an upper end of the oil extraction chamber may be pressurized prior to introduction of the oil-bearing solids into the extraction chamber to prevent any blowback or loss or solvent through the top of the oil extraction chamber when the oil-bearing solids are introduced into the oil extraction chamber.

In yet another aspect of the invention, a monitoring device may be used which can measure on a substantially continuous basis the quality or volume of extracted oil and solvent being removed from the extraction chamber and automatically controls the rate of incoming and outgoing oil-bearing solids being introduced into the extraction chamber.

DETAILED DESCRIPTION OF THE PREFERRED EMBODIMENT

Figure 1:
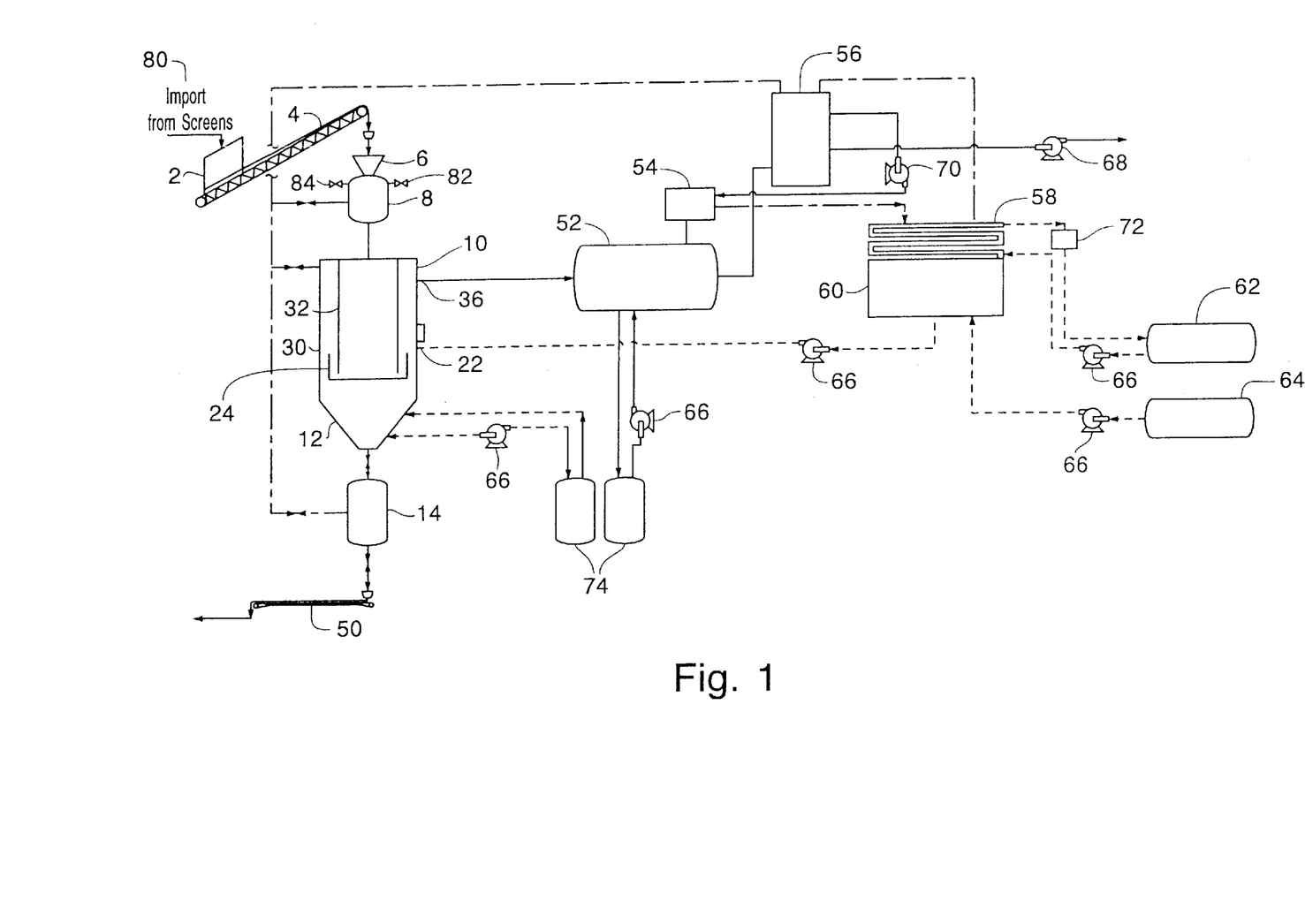
FIG. 1 is a process schematic depicting the components used to extract oil from an oil-bearing solid.

Referring now to FIG. 1, a process schematic is shown which depicts the components of the present invention. More detailed drawings and other components of the system may additionally be seen in FIGS. 2–5. In operation, an oil-bearing solid material 80 such as tar sand or vegetables are introduced onto a feed hopper 2 which transports the oil-bearing solid material 80 to an inlet conveyor 4. The inlet conveyor 4 transports the oil-bearing solid material 80 into a funnel inlet 6, or other type of hopper mechanism located on top of an inlet chamber 8. Depending on the type of oil-bearing solid material 80 being processed, a presoak solvent such as a distillate from an oil based product may be used to help remove the entrained oil from the oil bearing solid material 80 prior to introduction into the inlet chamber 8. More preferably light oil such as diesel fuel is used as a presoak agent for periods between about 5 and 30 minutes. Furthermore, it is possible to presoak the oil-bearing solid material 80 in the airtight inlet chamber 8 to prevent light ends from the solvent presoak agent from evaporating into the atmosphere.

Prior to introducing the oil-bearing solid material 80 into the inlet chamber 8, the inlet chamber is generally purged of oxygen with a purge gas such as argon or nitrogen through a purge gas inlet valve 82. The oxygen and purge gas is evacuated through a purge gas outlet valve 84 which is in communication with the oil flash tank 56 to allow recovery of the purge gas. Preferably, butane is used as a purge gas, which is readily available from gas vapor recovered during the processing of the oil-bearing solid material 80 if butane is used as a treatment solvent. Once the inlet chamber 8 is purged of oxygen the purge gas inlet valve 82 is closed and the funnel inlet valve 38 is closed. Lean solvent vapor such as propane or pentane and more preferably butane is introduced into the inlet chamber 8 until a pressure between about 15 psig and 30 psig is achieved. This pressure is generally equal to the pressure maintained in the oil extraction chamber 10.

Figure 2:
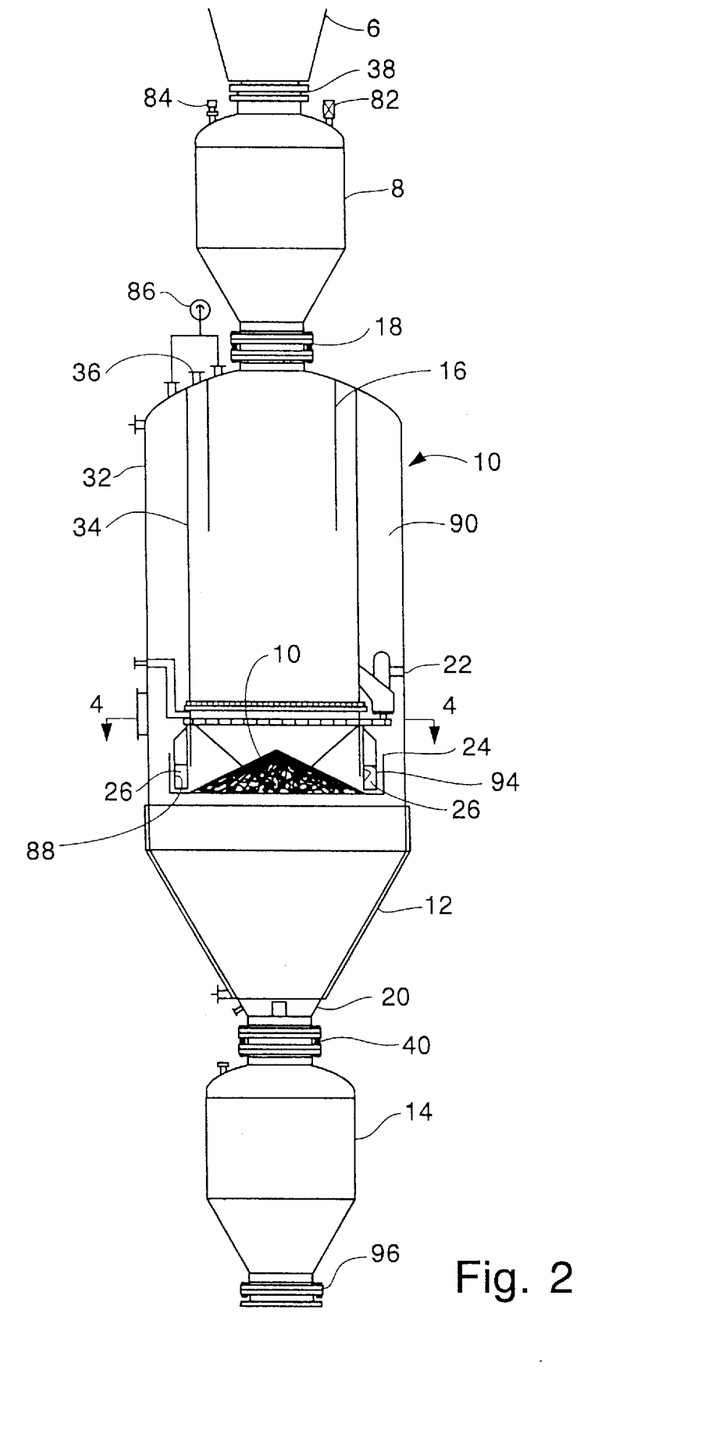
FIG. 2 is a cutaway sectional view of the inlet chamber, oil extraction chamber, drying chamber, outlet chamber and internal components thereof.

Referring now to FIG. 2, which is a cutaway sectional view of the oil extraction chamber 10, once sufficient pressure is achieved in the inlet chamber 8, the oil extraction chamber inlet valve 18 is opened and the oil-bearing solid material 80 allowed to fall into a clarifier column 16 located in the oil extraction chamber 10. The oil extraction chamber 10 and clarifier column 16 are completely filled with a solvent such as propane or pentane at a pressure and temperature which maintains the solvent in a liquid state. More preferably the solvent is butane, although solvents such as octane or methyl chloride may be used. This determination is made primarily based on the oil bearing solid material, cost, and availability of solvent. The clarifier column 16 is generally a concentric pipe with an open lower end which prevents turbulence in the oil extraction chamber 10 as the oil-bearing solid material 80 is directed into the oil extraction chamber 10. This laminar type flow as the solid material flows through the liquid solvent and creates a partitioned zone where recovery of the oil from the oil-bearing solid material takes place.

In another aspect of the present invention, a rotary type valve such as a rotary air lock feeder manufactured by Meyers Inc. in Stokee, Ill., may be used in place of the oil extraction chamber inlet valve 18. The rotary valve pushes the oil bearing solid material 80 into the extraction chamber 10 without requiring the inlet chamber 8 to be pressurized. The rotary valve thus provides a gas seal which prevents any gas blowback from the oil extraction chamber 10 to the inlet chamber 8 as a result of the pressure differential.

As the oil-bearing solid material 80 enters the clarifier column 16, both the solid and entrained oil comes in contact with the liquid solvent which is injected at one or more solvent inlets 22 preferably near the lower end of the extraction chamber 10. Thus, the oil-bearing solid materials 80 flow through the liquid solvent due to gravity from the top of the extraction chamber 10 to the bottom where the solids extraction chamber is located, while the liquid solvent travels from the solvent inlets 22 upward toward the oil/solvent outlet 36. During operation, as the oil bearing solid material 80 is introduced into the extraction chamber 10, the solvent occupying the extraction chamber 10 is displaced by the oil bearing solid material and eventually forced through the oil/solvent outlet 36. Although the solvent inlets 22 may be located in numerous locations, preferably the solvent inlets 22 are located near the bottom of the oil extraction chamber just above the auger 26 and solids extraction channel 24.

As rich, pure liquid solvent such as butane comes in contact with the oil-bearing solid materials 80 near the solids extraction chamber 24, the sand has already been cleaned in a continuous manner with the liquid solvent and extracted oil from the top of the oil extraction chamber downward towards the solids extraction channel 24. Thus, a chromatographic, partitioned layering effect is achieved inside the oil extraction chamber where the oil-bearing solid material 80 is subjected to increasing concentrations of solvent as the material travels from the top of the oil extraction chamber 10 to the bottom of the oil extraction chamber 10. This continuous, partitioned recovery process provides exceptional efficiency in removing the oil from the oil-bearing solid materials 80.

The continuous and efficient oil removal from high volumes of oil-bearing solid materials 80 is made possible with a solids extraction chamber 24, an auger 26 interposed within the solids extraction chamber 24, and an extraction chamber pressure differential 86 which is maintained between the interior of the oil extraction chamber 10 and an extraction chamber annulus 90 space defined by the interior wall surface of the extraction chamber exterior shell 32 and an exterior wall surface of an extraction chamber interior shell 34. The pressure differential 86 is between about 2 and 20 psig, although preferably the pressure differential 86 is about 5 psig.

The pressure differential 86 provides sufficient energy to force the liquid solvent from the extraction chamber annulus 90 through the solids extraction channel 24 and upward towards the oil/solvent outlet 36. As the liquid solvent is being forced through the solid material in the solids extraction channel 24, the auger 26 is continuously removing solid materials from the solids extraction channel 24 at a controlled rate. Thus, the substantially oil free solid materials can be removed from the solids extraction channel 24 without removing any substantial volume of liquid solvent, which is flowing in a counterflow direction towards the oil/liquid solvent outlet 36. As a result of the extraction chamber pressure differential 86, a substantially constant liquid solvent level 88 is maintained in the solids extraction chamber 24. This constant liquid solvent level 88 further prevents the introduction of any gas into the inner chamber of the oil extraction chamber 10, which is undesirable since the gas and liquid solvent will begin channeling, causing solids to migrate upwards and disrupting the laminar flow in the oil extraction chamber. When operating at optimum conditions, it is believed that volumes of sand approaching 200 tons/hour can be processed, which may yield between 0.5 and 1.5 barrels of oil for every cubic yard of oil bearing sand processed.

Figure 3:
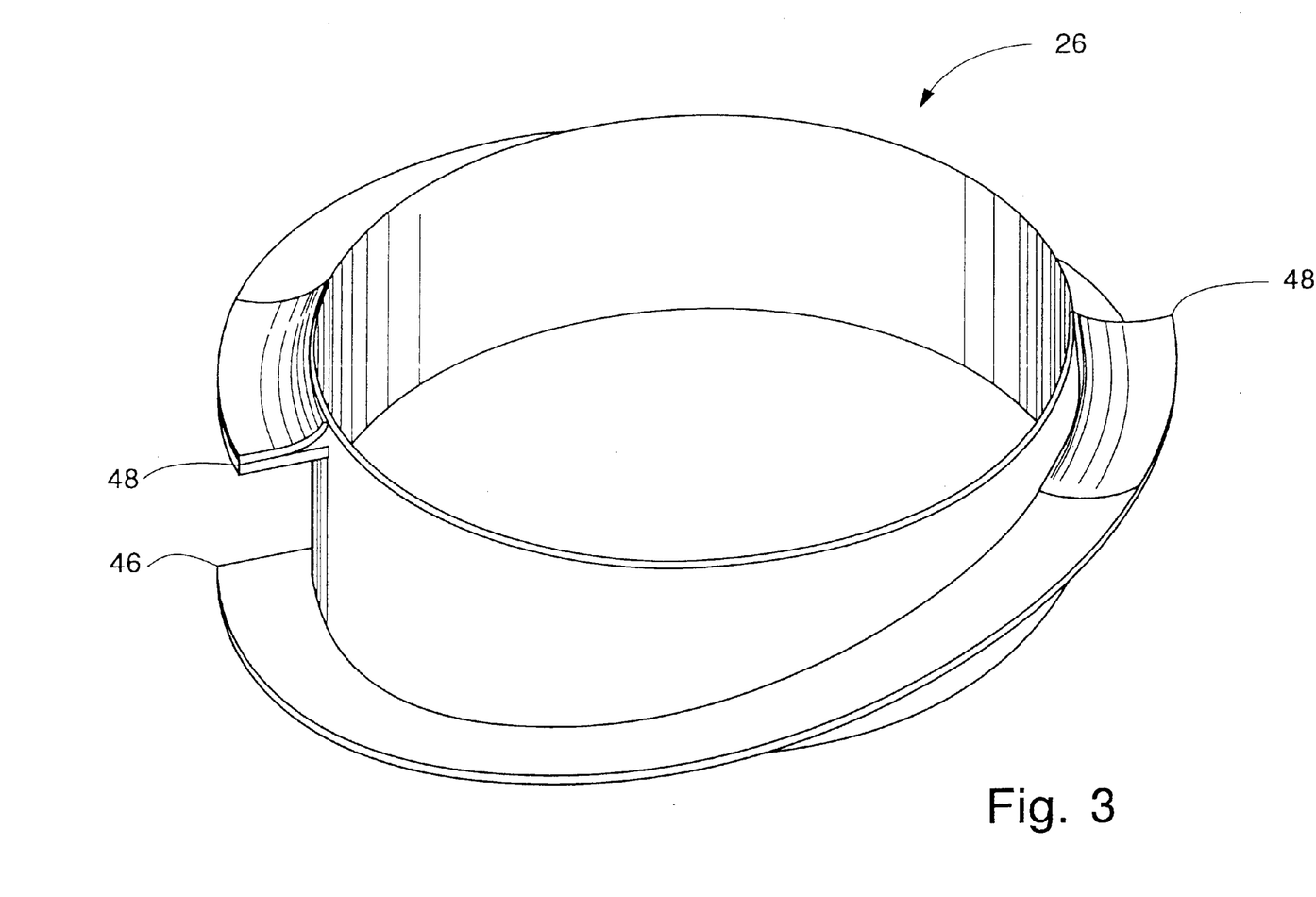
FIG. 3 is a perspective view of an auger assembly used to extract solids from the solids extraction chamber.

Referring now to FIG. 3, an isolated perspective view of the auger 26 is shown without the accompanying motor or drive mechanism. In one embodiment of the present invention, the auger 26 is concentric and fits around the outer surface of the oil extraction chamber interior shell 32. The auger is operatively positioned in close proximity to the bottom of the solids extraction channel 24 within the solids extraction channel 24 and has at least one leading edge 46 and one trailing edge 48 which is positioned near or slightly above the top of the solids extraction channel 24. More preferably the auger has two leading edges 46 positioned approximately 180 degrees apart and two trailing edges 48 positioned approximately 180 degrees apart. As the auger travels in a circular path, the leading edge 46 pushes the substantially oil free solid material upwards towards the trailing edge 48.

Figure 4:
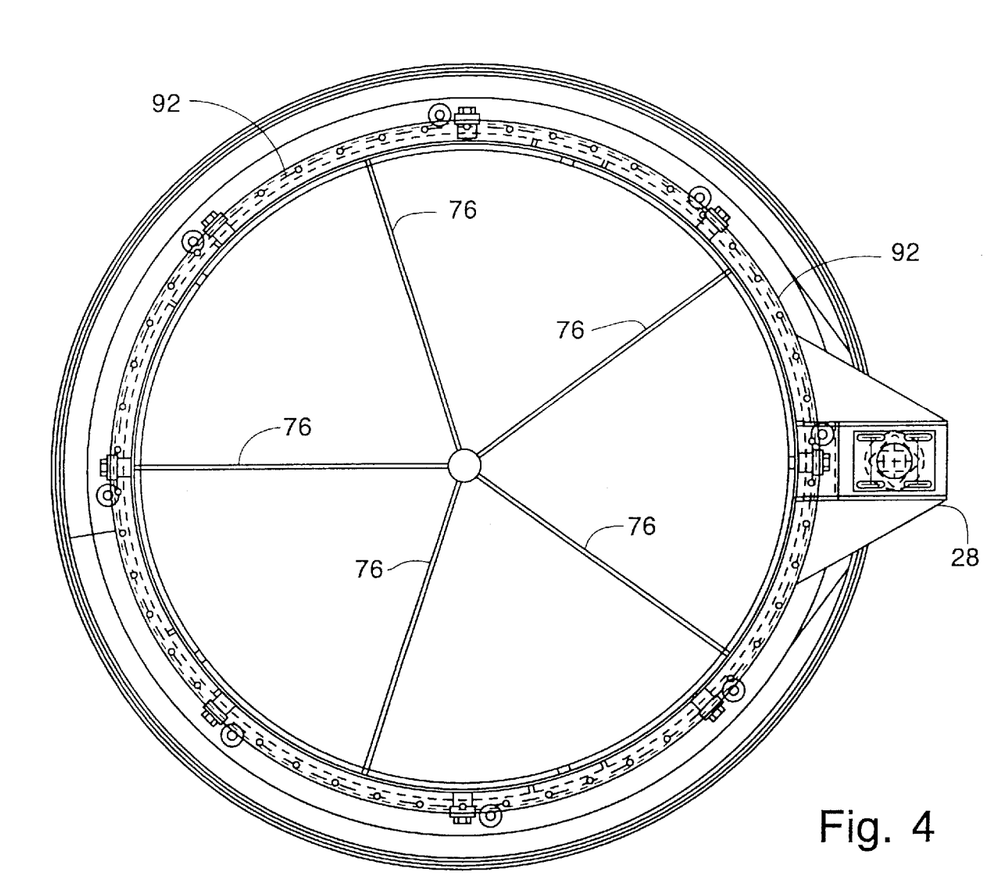
FIG. 4 is a cutaway sectional view of the auger assembly and oil extraction chamber taken at line 4–4 of FIG. 2.
Figure 5:
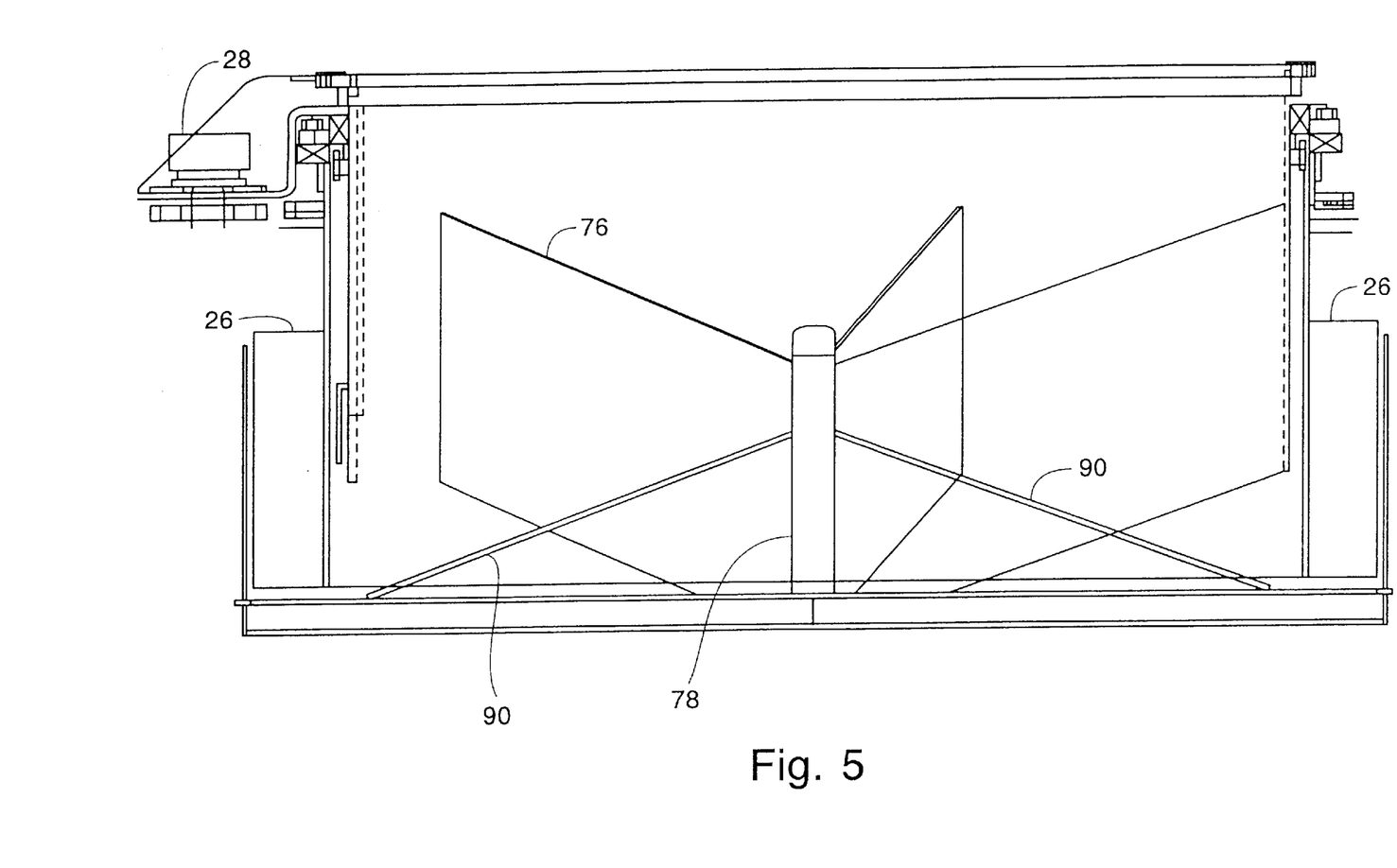
FIG. 5 is a cutaway front elevation view of the lower end of the oil extraction chamber showing the solids extraction channel, support fins and auger motor.

Referring now to FIG. 4 and FIG. 5, the auger motor 28 auger chain 92 used in combination with the auger 26 can be seen. As the auger motor 28 is operated, a gear mechanism interconnected to the auger chain 92 drives the leading edge of the auger 46 along the bottom of the solids extraction channel 24, gradually pushing solid materials upward towards the upward edge 48 of the auger assembly and eventually over an upturned lip 94 of the oil extraction chamber 10. The substantially oil free solid materials in the oil extraction chamber 10 are encouraged to move outward towards the solids extraction channel 24 by a cone-shaped bottom surface 90. The rate of speed of the auger motor 28 and hence auger leading edge 46 is monitored and regulated based on the quality of the extracted oil and solvent recovered from the oil extraction chamber. In one embodiment of the present invention, the oil and solvent quality is monitored with a vortex flow meter, by mass balance, or more preferably a mass spectrometer.

Referring again to FIG. 1 and 2, as the substantially oil free solid materials are removed from the solids extraction chamber 24, the solids fall into a drying chamber 12. In one aspect of the present invention, heat is provided to the drying chamber with hot water or glycol, which is circulated around the drying chamber 12. The water or glycol is heated with a conventional line heater 74 and circulated with a liquid pump 66, although other methods of heating the drying chamber 12 which are well known in the chemical processing industry may be used. As the heat energy is applied to the solids in the solids drying chamber 12, any residual liquid solvent attached to the solid material is heated and vaporized. The solvent vapor is then condensed to a liquid state on the exterior wall surface of the extraction chamber interior shell 34, which has a reduced temperature as a result of the liquid solvent being continuously introduced into the interior of the oil extraction chamber 10. As the solvent condenses in the extraction chamber annulus 90, the liquid solvent flows towards the solids extraction chamber 24 where the liquid solvent is reintroduced into the oil extraction chamber 10 as a result of the extraction chamber pressure differential 86.

To enhance the removal of any residual solvent from the substantially oil free solids in the drying chamber 12, a vibration plate 20 or vibration rod may be installed near the bottom of the drying chamber 12 or on the oil extraction chamber 10. The vibration plate 20 provides vibration energy to the substantially oil free solids and improves the overall efficiency of the oil recovery process. In a preferred embodiment the vibrating rod extends into the oil extraction chamber 10 to enhance the removal of oil from the oil bearing solid material, 80.

Once the substantially oil free solids have been heated, the solids fall into an outlet chamber 14 after passing through a drying chamber outlet valve positioned between the drying chamber 12 and outlet chamber 14. The drying chamber outlet valve 40 is subsequently closed and the pressure in the outlet chamber 14 is evacuated to atmospheric pressure to allow the opening of the outlet chamber discharge valve 96. When the outlet chamber discharge valve 96 is opened, the substantially oil free solid materials are dropped onto a conveyor, or other forms of transportation to facilitate removal from the processing site and reintroduction into the environment.

To improve the efficiency of the process system, the present invention recirculates the solvent used to remove the oil from the oil-bearing solid materials 80. Referring again to FIG. 1, as recovered oil and solvent is removed from the oil extraction chamber 10 through the oil/solvent outlet 36, these products flow by means of a positive pressure differential to an oil/solvent separator vessel 52. To enhance separation, heat energy may be provided to the separator by circulating water or glycol or other fluids around the separator or by other means known by those skilled in the art. After separation, the recovered oil is transported to an oil flash tank 56 for temporary storage prior to being pumped into an oil sales pipeline or into trucks for removal from the processing site.

The solvent separated in the oil/solvent separator 52 is generally routed through a gas surge tank 54 and eventually through a condenser 58 which condenses the gaseous solvent into a liquid phase. The energy needed to cool the condenser to an adequate temperature is provided by a propane storage tank 62, although a chiller operating with other types of fuel such as natural gas, gasoline, or butane may be used. If additional solvent is required for make-up, a solvent storage tank 64 and liquid transfer pump 66 is used which is in communication with a solvent receiver 60. The solvent receiver 60 is in turn interconnected to a liquid transfer pump 66 which pumps the liquid solvent back to the solvent inlets 22 located on the extraction chamber 10, thus completing the continuous cycle.

The foregoing description of the present invention has been presented for purposes of illustration and description. Furthermore, the description is not intended to limit the invention to the form disclosed herein. Consequently, variations and modifications commensurate with the above teachings and skill and knowledge of the relevant art are within the scope of the present invention. The embodiments described herein above are further intended to explain best modes of practicing the invention and to enable others skilled in the art to utilize the invention in such, or other embodiments with various modifications required by the particular application(s) or use(s) of the present invention. It is intended that the appended claims be construed to include alternative embodiments to the extent permitted by the prior art.

To provide clarity to the figures, a list of individual components and related numbering are provided as follows:

02 Feed Hopper
04 Inlet Conveyor
06 Funnel Inlet
08 Inlet Chamber
10 Oil Extraction Chamber
12 Drying Chamber
14 Outlet Chamber
16 Clarifier Column
18 Extraction Chamber Inlet Valve
20 Vibration Plate
22 Solvent Inlet
24 Solids Extraction Channel
26 Auger
28 Auger Motor
30 Extraction Chamber External Shell
32 Extraction Chamber Internal Shell
34 Extraction Chamber Annulus
36 Oil/Solvent Outlet
38 Funnel Inlet Valve
40 Drying Chamber Outlet Valve
42 Drying Chamber Heating Inlet
44 Drying Chamber Heating Outlet
46 Auger Leading Edge
48 Auger Trailing Edge
50 Solids Removal Conveyor
52 Oil/Solvent Separator
54 Gas Surge Tank
56 Oil Flash Tank
58 Condenser
60 Solvent Receiver
62 Propane Storage Vessel
64 Solvent Storage Vessel
66 Liquid Transfer Pump
68 Oil Sales Pump
70 Vapor Pump (Compressor)
72 Chiller
74 Line Heater
76 Extraction Chamber Support Fins
78 Extraction Chamber Support Rod
80 Oil-Bearing Solid Material
82 Purge Gas Inlet Valve
84 Purge Gas Outlet Valve
86 Extraction Chamber Pressure Differentiator
88 Constant Liquid Solvent Level
90 Extraction Chamber Annulus
92 Auger Chain
94 Outlet Chamber Discharge Valve
96 Outlet Chamber Discharge Valve
98 Cone-Shaped Bottom Surface

What is claimed is:

1. A process for extracting oil from oil-bearing solid material, comprising:

(a) introducing said oil-bearing solid materials into an inlet compartment;

(b) introducing a solvent capable of removing oil from said oil-bearing solid materials into an oil extraction chamber having an upper end and a lower end at a temperature between about 0° F. and 350° F. and a pressure between about 2 psig and 400 psig;

(c) passing said oil-bearing solid materials from said inlet compartment to said upper end of said oil extraction chamber;

(d) flowing on a substantially continuous basis said oil-bearing solid materials through said solvent in said oil extraction chamber at pressures between about 2 psig and 400 psig and temperatures between about 0° F. and 350° F., whereby said oil is extracted from said oil-bearing solid materials;

(e) removing said extracted oil and said liquid solvent from said extraction chamber to a separation vessel;

(f) collecting said extracted oil and said solvent; and (g) removing said substantially oil free solid material from said oil extraction chamber through a solids extraction channel while maintaining a substantially constant gas/liquid solvent interface in an upturned lip of said solids extraction channel.

2. The process of claim 1, wherein said step of removing said extracted oil and said liquid solvent from said extraction chamber comprises displacing said extracted oil and said solvent with said oil-bearing solid materials introduced into said oil extraction chamber.

3. The process of claim 1, wherein said oil is removed from said oil-bearing materials in a partitioned manner, whereby more soluble oils are removed from said oil-bearing solid materials near said upper end of said oil extraction chamber than near said lower end of said oil extraction chamber.

4. The process of claim 1, wherein said extracted oil and said liquid solvent are removed from said extraction chamber at more than one vertical location on said oil extraction chamber.

5. The process of claim 1, wherein said inlet compartment is funnel shaped with an open top for receiving said oil-bearing materials.

6. The process of claim 1, wherein said inlet compartment includes opening means and closing means for substantially sealing said inlet compartment, whereby said inlet compartment is capable of holding pressure.

7. The process of claim 6, further comprising the step of injecting a fluid into said inlet compartment to provide a pressure in said inlet compartment between about 2 psig and 400 psig.

8. The process of claim 7, wherein said fluid comprises methane, ethane, propane, butane, pentane, hexane, heptane, octane, nonane or combinations thereof.

9. The process of claim 1, further comprising the step of applying heat to said recovered solid phase of said oil-bearing materials to recover residual solvent from said solid phase of said oil-bearing material.

10. The process of claim 1, further comprising the step of reintroducing said liquid solvent recovered in said separation vessel into said oil extraction chamber, whereby said solvent is recycled.

11. The process of claim 1, further comprising the step of applying sonic energy to said oil-bearing solid material to enhance separation of said oil from said solid phase of said oil-bearing material.

12. The process of claim 1, wherein said solvent comprises methane, ethane, propane, butane, pentane, hexane, heptane, octane, nonane or combinations thereof.

13. The process of claim 1, wherein said solvent comprises a surfactant and water.

14. The process of claim 1, further comprising the step of presoaking said oil-bearing solid material with said solvent prior to introducing said oil-bearing solid material into said oil extraction chamber.

15. The process of claim 1, further comprising the step of blending said oil-bearing solid material with said solvent prior to introducing said oil-bearing solid material into said oil extraction chamber.

16. The process of claim 1, further comprising the step of separating said extracted oil and said solvent in said separation vessel.

17. The process of claim 15, further comprising the step of applying heat energy to said extracted oil and said solvent in said separator to enhance the separation of said solvent and said extracted oil.

18. The process of claim 16, further comprising the step of condensing said solvent existing in a vapor phase downstream of said separator to enhance recovery of said solvent.

19. The process of claim 1, further comprising maintaining a pressure differential of at least about 2 psig between the interior of the oil extraction chamber and an annular space defined surface of said oil extraction chamber and an interior surface of an outer shell which substantially encloses said oil extraction chamber, whereby any residual solvent flows from said annular space into said oil extraction chamber.

20. The process of claim 1, wherein said solids are removed from said solids extraction chamber by an auger operatively positioned in said solids extraction chamber.

21. The process of claim 1, further comprising the step of regulating the rate said oil-bearing solid material is introduced into said oil extraction chamber based on measuring the volume of purity of said recovered oil and said solvent recovered from said oil extraction chamber.

22. The process of claim 1, wherein said upturned lip has an elevation greater than a lowest end of said oil extraction chamber, wherein said substantially oil free solid material changes direction from within said oil extraction chamber at least about 180° prior to being discharged from said solids extraction channel.

23. The process of claim 1, wherein said substantially oil free solid materials are removed from said solids extraction channel without removal of any substantial volume of said liquid solvent through said solids extraction channel.

24. A continuous process for extracting oil from oil-bearing materials, comprising:

(a) introducing said oil-bearing materials into an upper end of an inlet chamber;

(b) introducing a solvent capable of extracting oil from said oil-bearing material into an oil extraction chamber at a temperature between about 0° F. and 350° F. and a pressure between about 5 psig and 400 psig;

(c) passing the oil-bearing material from said inlet chamber to said oil extraction chamber;

(d) passing said oil-bearing material on a substantially continuous basis through said liquid solvent in said extraction chamber at pressures between about 2 psig and 400 psig and temperatures between about 0° F. and 350° F., whereby said oil is extracted from said oil-bearing material;

(e) displacing said extracted oil and said solvent in liquid phase from said oil extraction chamber with said oil-bearing materials to remove said extracted oil and said liquid solvent from said oil extraction chamber to a separation vessel;

(f) separating said extracted oil and said solvent;

(g) maintaining a substantially constant gas/liquid solvent interface in a solids extraction channel having an upturned lip; and (h) removing substantially oil free solids from said solids extraction channel operatively positioned near the bottom of said oil extraction chamber without removing any substantial volume of said liquid solvent through said solids extraction channel.

25. The process of claim 24, wherein said inlet compartment is funnel shaped.

26. The process of claim 24, wherein said inlet compartment is capable of being opened and closed and maintaining a pressure of between about 2–400 psig.

27. The process of claim 24, further comprising the step of injecting a fluid capable of extracting oil from hydrocarbon bearing materials into said compartment.

28. The process of claim 27, wherein said fluid comprises methane, ethane, propane, butane, pentane, hexane, heptane, octane, nonane or combinations thereof.

29. The process of claim 24, wherein said substantially oil free solids are removed from said oil extraction chamber with an auger operatively positioned in said solids extraction channel.

30. The process of claim 24, wherein a pressure differential of between about 1 and 25 psig is maintained between the interior of said oil extraction chamber and the interior of an outer shell which substantially encloses said oil extraction chamber wherein said liquid level in said solids extraction channel is maintained at a substantially constant level.

31. The process of claim 24, further comprising the step of applying acoustic energy to said oil-bearing hydrocarbon material to enhance the separation of said oil and said hydrocarbon bearing material.

32. The process of claim 24, further comprising heating said substantially oil free materials in a solids drying chamber to recover residual solvent attached to said hydrocarbon bearing solid materials.

33. The process of claim 24, wherein said solvent comprises methane, ethane, propane, butane, pentane, hexane, heptane, octane, nonane, or combinations thereof.

34. The process of claim 24, wherein said solvent comprises at least one surfactant.

35. The process of claim 24, wherein said upturned lip has an elevation greater than a lowest end of said oil extraction chamber, wherein said substantially oil free solid material changes direction from within said oil extraction chamber at least about 180° prior to being discharged from said solids extraction channel.

36. A continuous method of extracting oil from a hydrocarbon-bearing solid material, comprising the steps of:

(a) introducing a hydrocarbon-bearing solid material into an upper end of an inlet chamber;

(b) injecting a fluid into said inlet chamber to provide a pressure in said inlet chamber between about 2 psig and 400 psig;

(c) introducing a solvent capable of removing oil from said hydrocarbon bearing solid material into an oil extraction chamber at a temperature between about 0° F. and 350° F. and a pressure between about 2 psig and 400 psig;

(d) passing said hydrocarbon-bearing solid material from said inlet chamber into an upper end of said oil extraction chamber;

(e) flowing said hydrocarbon-bearing solid material from the upper end of said oil extraction chamber downward through said solvent in a liquid phase towards said lower end of said oil extraction chamber, whereby oil is extracted from said hydrocarbon-bearing solid material;

(f) removing said extracted oil and said liquid solvent near said upper end of said extraction zone to a separation vessel;

(g) separating said extracted oil and said solvent in said separation vessel;

(h) removing said solid materials from said extraction zone through a solids extraction channel to a solids drying chamber while maintaining a substantially constant gas/liquid solvent interface in said solids extraction channel, said solids extraction channel having an upturned lip with an elevation greater than a lowest end of said oil extraction chamber, wherein said solid materials may be removed from said solids extraction channel without removing any substantial volume of said liquid solvent from said solids extraction channel;

(i) vaporizing a residual solvent component attached to said solids in said solids drying chamber;

(j) condensing said residual solvent component to recover additional solvent;

(k) collecting said extracted oil and said solid material; and (l) recirculating said solvent recovered in said separator for reintroduction into said oil extraction chamber.

37. The method of claim 36, wherein said step of condensing occurs in an annular space defined by the exterior walls of said oil extraction chamber and an interior wall of an outer shell enclosing at least a portion of said oil extraction chamber.

38. The method of claim 36, wherein said step of removing said extracted oil and said liquid solvent from said oil extraction chamber comprises displacing said extracted oil and said solvent with said solid materials introduced into said oil extraction chamber.

39. The method of claim 36, further comprising the step of monitoring the volume or quality of said extracted oil and said liquid solvent recovered from said oil extraction chamber and regulating the rate of said hydrocarbon bearing solid material entering said oil extraction chamber.

* * * * *